Figure 1:
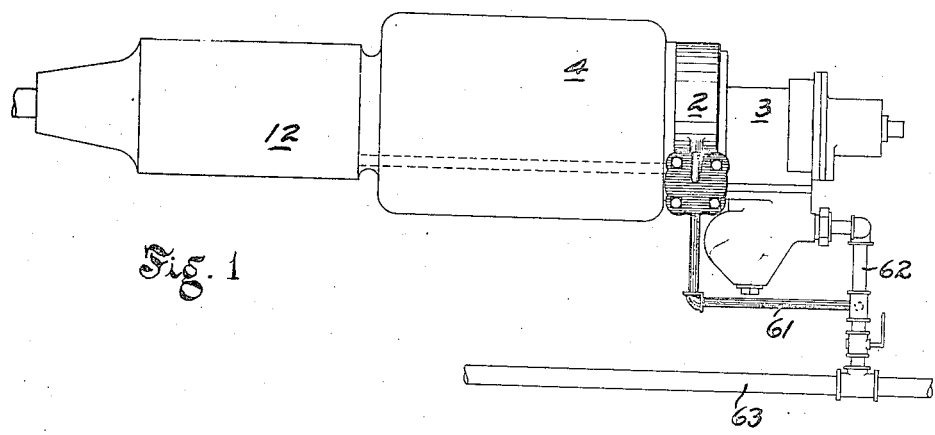

Feb. 6, 1923.

T. J. STEINKELLER.
CONTROL VALVE FOR AIR BRAKE SYSTEMS.
FILED FEB. 28, 1921.

1,444,281.

2 SHEETS—SHEET 1.

WITNESS
H. Sherburne.

INVENTOR
T. J. Steinkeller.
BY
White Prost Evans
his ATTORNEYS

Feb. 6, 1923.
T. J. STEINKELLER.
CONTROL VALVE FOR AIR BRAKE SYSTEMS.
FILED FEB. 28, 1921.
1,444,281.
2 SHEETS—SHEET 2.
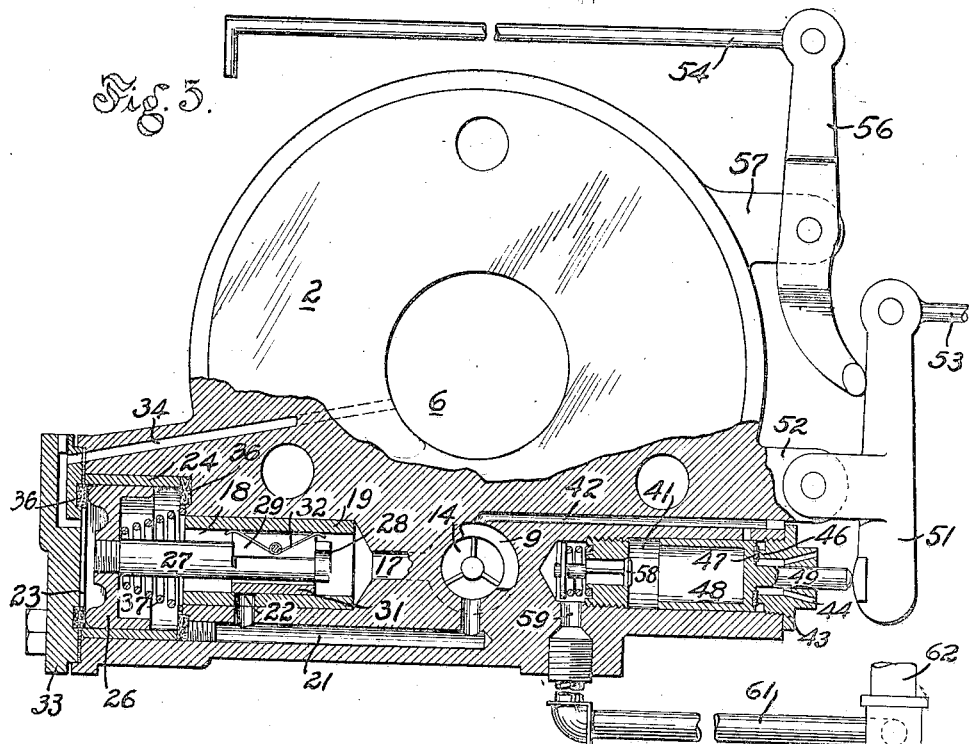
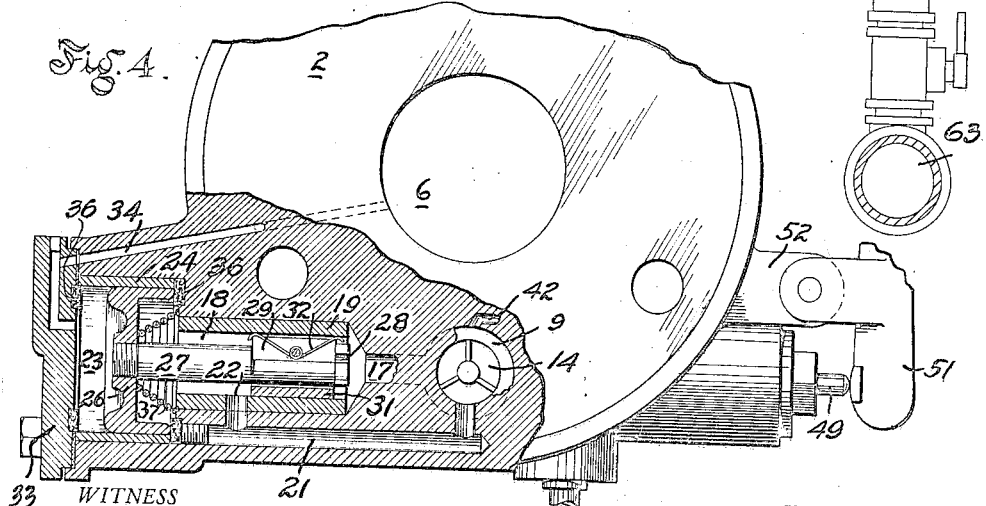
WITNESS
H. Sherburne
INVENTOR
T. J. Steinkeller
BY
White Prost Evans
his ATTORNEYS Patented Feb. 6, 1923.

1,444,281

UNITED STATES PATENT OFFICE.

THOMAS J. STEINKELLER, OF BERKELEY, CALIFORNIA.

CONTROL VALVE FOR AIR-BRAKE SYSTEMS.

Application filed February 28, 1921. Serial No. 448,396.

*To all all whom it may concern:*

Be it known that I, THOMAS J. STEIN-KELLER, a citizen of the United States, and a resident of Berkeley, county of Alameda, and State of California, have invented a new and useful Control Valve for Air-Brake Systems, of which the following is a specification.

My invention relates to air brakes apparatus.

The principal object of my invention is the provision of a control valve for supplementing and modifying the action of the triple valve in present standard equipment, so that the air brake system is characterized by the following main features:

1. The pressure in the brake cylinder after a full service or emergency application of the brakes cannot fall below that resulting when the auxiliary reservoir and brake cylinder pressures are equalized; that is to say, except during light application of the brakes with a nearly full pressure reserve in the auxiliary reservoir, brake cylinder pressure cannot fall below that sufficient to bring the train to a stop.

2. After a service or emergency application of the brakes, recharging of the auxiliary reservoir can be commenced immediately without releasing the brakes.

3. With the recharging of the auxiliary reservoir under way, the brakes are released automatically when the auxiliary reservoir pressure has risen to a point in excess of the brake cylinder pressure by a predetermined amount. When cars standing with brakes set, are to be picked up without switching, the brakes will automatically release when the auxiliary reservoir pressure is augmented to the predetermined critical pressure. It is therefore not necessary to bleed the brakes on such cars.

4. The brake cylinder pressure may be increased in any desired amount without releasing the brakes.

5. In a long train the brakes at the rear may be released before those at the head of the train.

6. High economy of air, and therefore of steam and fuel and an incalculable increase in the assurance of safety to passengers, crew and equipment.

Another object of the invention is to provide a device of the character described and including a correlated bleed valve for exhausting, when necessary, the brake cylinder, all contained within a housing of such dimensions and proportions that it may readily be interposed in standard equipment between the triple valve and the auxiliary reservoir, without material changes and at small expense.

My invention possesses many other objects and features of advantage, some of which, with the foregoing, will be set forth in the following description of my invention. It is to be understood that I do not limit myself to the showing made by the said description, as I may adopt variant forms of my invention within the scope of the claims.

Figure 2:
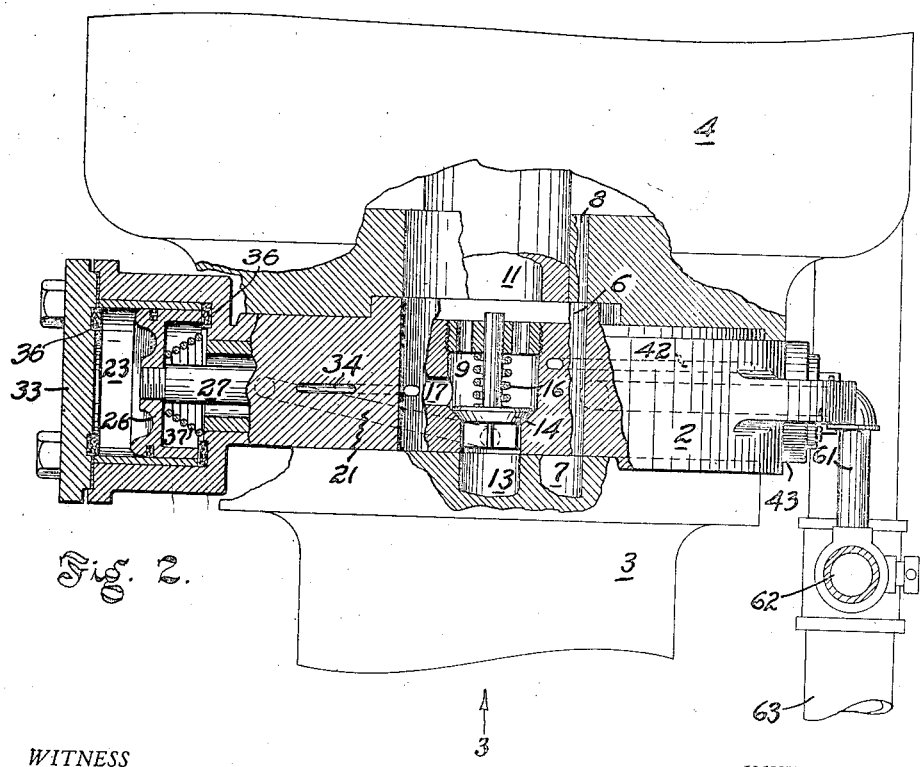

Referring to the drawings: Fig. 1 is a side elevation of the group of air brake apparatus with which my control valve is assembled and correlated. Fig. 2 is a plan view, mainly in section, showing my valve and portions of the auxiliary reservoir and triple valve. Fig. 3 is an elevation, largely in section of the triple valve side of my control valve. It is taken in a direction indicated by the arrow 3 in Fig. 2. The position of the parts is that taken when the auxiliary reservoir pressure is below the critical pressure at which automatic release of the brakes occurs. The bleeder valve correlated with my control valve is shown at the right of the figure. Fig. 4 is an elevation similar to Fig. 3, but showing the control valve, as in Fig. 2, in the position assumed by the parts when the auxiliary reservoir pressure has reached or exceeded the critical pressure at which the brake cylinder is automatically exhausted to release the brakes.

My control valve comprises a housing 2 so formed as to adapt it for insertion between the triple valve 3 and the auxiliary reservoir 4 of the standard air brake equipment. A passage 6 in the housing, alined with passages 7 and 8 in the triple valve and auxiliary reservoir respectively, preserves communication between the two.

Formed in the housing 2 on one side of the control passage 6 is a passage 9 alined with and connecting the passage 11, in the brake cylinder pipe leading to the brake cylinder 12, with the passage 13 in the triple valve. A valve 14, normally closed by the spring 16 is arranged in the passage 9 to permit air from the triple valve to flow to the brake cylinder but to prevent the return flow to the triple valve thru the passage 9.

On the reservoir side of the valve 14, the passage 9 is connected by passage 17 with the cylindrical chamber 18 formed in the housing and lined with the bushing 19. This chamber is also connected by passage 21 with the triple valve side of the valve 14, the passage opening into the chamber in the port 22.

Adjoining and alined with the chamber 18 is a larger chamber 23 lined with the bushing 24, and in which is slidably arranged the piston 26. A piston rod 27 is provided with a spider 28 slidable in the bushing 19; and adjacent the spider, the rod is reduced to fit between the abutments 29 of the slide valve 31 which controls the port 22, and which is resiliently pressed upon its seat by the spring 32.

The outer end of the chamber 23 is closed by the cover plate 33 in which the passage 34, opening at one end into passage 6, is continued, so that the chamber 23 is always in communication with passage 6 and the auxiliary reservoir.

In order to prevent leakage past the piston 26, annular gaskets 36 are arranged at each end of the chamber 23, so that at either end of its stroke the piston is securely seated on a gasket. A coil spring 37 preferably of a strength to balance an air pressure of about 7 pounds per square inch against the piston in the chamber 23, is interposed between the opposite side of the piston and the housing.

In the succeeding exposition of the operation of my valve, I will assume an auxiliary reservoir pressure of 90 pounds when fully charged, and a ratio of 2½ to 1 in the capacities of the auxiliary reservoir and brake cylinder respectively. It is of course understood that the pressures stated are used for illustration and that in practice the pressures will vary from those given. Initial pressure in train line and auxiliary reservoir, conditions of leakage, the ratio of auxiliary reservoir and brake cylinder capacities, the capacity of the connecting passages and the distance thru which the air must move, all vary. The actual pressures will be the totalized effect of all these factors.

With the brakes off and the auxiliary reservoir fully charged, the parts are in the position shown in Figs. 2 and 4, the piston 26 being held by auxiliary reservoir pressure in its extreme position at the right (of Fig. 2). The spring 37 is compressed and the port 22 uncovered, so that the by-pass around the valve 14 is open, placing the brake cylinder in communication with the open air thru the triple valve, the latter being free to function in the usual way.

Following a small reduction, say of 10 pounds, in the train line pressure, air from the auxiliary reservoir passes thru the triple valve into the passage 9, past valve 14 into the passage 11 and thence to the brake cylinder. Upon an increase in the train line pressure, the air in the brake cylinder returns to the triple valve thru the by-pass 21 and is exhausted into the air, the port 22 being kept uncovered by the superior auxiliary reservoir pressure exerted against the left side (Fig. 2) of the piston 26. The opposing pressure upon the right side is, of course, equal to the brake cylinder pressure plus the pressure of the compressed spring 37. Thus with ordinary light applications of the brakes, the triple valve operates in the usual way, and the apparatus of my invention is quiescent and of no effect. However if a full service or emergency application of the brakes is made, the full pressures in the auxiliary reservoir and the brake cylinder equalize to about 64 pounds. The pressure on the left side of the piston 26 is now 64 pounds and on the right side 71 pounds (64 pounds plus 7 pounds exerted by the spring 37). Thus unbalanced the piston moves to the left as in Fig. 3, covering port 22 and closing the by-pass 21 around the valve 14. Irrespective of the immediate functioning of the triple valve, the exhaust passage for the brake cylinder (the by-pass) is now closed and the brakes are held on with a brake cylinder pressure of 64 pounds.

Under ordinary circumstances this braking pressure will bring the train to a stop unless the air in the brake cylinder is permitted to exhaust, but this can take place only with the movement to the right of the piston 26 and the opening of the by-pass 21. Before such movement is initiated, the auxiliary reservoir pressure must be augmented to at least 71 pounds by recharging. As soon as the pressures in the auxiliary reservoir and brake cylinder equalize, the engineer may begin recharging the auxiliary reservoir by raising the train line pressure, the triple valve functioning in the usual way, although the operative pressure of 64 pounds in the brake cylinder is unaffected. When the auxiliary reservoir pressure reaches 71 pounds, the brake cylinder pressure of 64 pounds plus spring pressure of 7 pounds against the piston 26 is balanced, and the engineer may now move his valve to lap, holding all parts in status quo and maintaining the pressure of 64 pounds in the brake cylinder as long as necessary. Upon a further increase in auxiliary reservoir pressure, the piston 26 is forced to the right, gradually uncovering the port 22 and permitting the brake cylinder to exhaust so that the brakes release. Recharging now continues until the gauge shows the desired pressure in the auxiliary reservoir.

From the above it will be clear that after a service or emergency application of the brakes, they cannot be released until the auxiliary reservoir has been recharged to a pressure in excess of the brake cylinder pressure by a predetermined amount, and that when this critical pressure is reached the exhaustion of the brake cylinder and consequent release of the brakes occurs automatically.

Assume, now that instead of lapping his valve to hold the brakes on at 64 pounds pressure, the engineer desires to increase his braking pressure. The careful engineer will always immediately begin recharging as soon as the pressures in the auxiliary reservoir and brake cylinder equalize, lapping his valve if desired when his gauge shows an auxiliary reservoir pressure of 71 pounds, the piston 26 then being in equilibrium. At this point he is prepared for any contingency, and may continue to hold the brakes at the brake cylinder pressure of 64 pounds, or continue recharging which will automatically release the brakes as explained above, or if need arises he may increase the braking pressure. This is done by making a reduction, say of 3 pounds in the train line pressure bringing it to 68 pounds. This reduction causes the triple valve to function so that the auxiliary reservoir and brake cylinder pressures are again equalized, this time to about 69 pounds. The air pressures against the piston 26 are the same (69 pounds) on both sides so that the spring 37 is effective to keep the valve 31 over the port 22, and prevent the escape of air from the brake cylinder. With the equalization of auxiliary reservoir and brake cylinder pressures, the engineer again begins recharging, and when his gauge indicates for the second time an excess auxiliary reservoir pressure of 7 pounds, he may, if still more braking pressure is required, make another reduction to once more equalize the auxiliary reservoir and brake cylinder pressures, this time to 74 pounds. Thus the engineer may rapidly build up his braking pressure with successive increments of 5 pounds, by alternately recharging to the predetermined excess, and equalizing before such excess increases sufficiently to operate the exhaust valve piston to open the brake cylinder exhaust passage.

From the above it will be clear that aside from enabling the engineer to fully recharge the auxiliaries without releasing his brakes, or to augment the braking power to any desired extent beyond the first equalization pressure of 64 pounds, my valve provides other possibilities in train control which give it an importance of the first magnitude in the factors of safety, economy and efficiency. For instance, in a lengthy train with present equipment, a period of about three minutes may elapse between the release of the brakes on the first and last cars. This sometimes results in pulling the train in two. By proper manipulation of my valve, the engineer may effect the release of the brakes at the rear of his train before those at the front end. Thus, after a full service application, the pressures in the auxiliary reservoirs and brake cylinders on all cars are equalized to 64 pounds. The engineer then begins recharging. The triple valves on the forward cars first respond to the increased train line pressure and when the pressure in the connected auxiliary reservoirs has increased sufficiently, but before the critical pressure at which the exhaust valve pistons 26 in the first cars are operated, and before the pressures in the auxiliary reservoirs in the last cars have materially or at all increased, the engineer makes a slight reduction, permitting the pressures in the auxiliary reservoirs and brake cylinders on the first cars to equalize say, to 68 pounds; then, before the low pressure wave has had time to affect the exhaust valve pistons on the rear cars, increasing the train line pressure again to recharge all the auxiliary reservoirs. The equalized pressure in the first car is now 68 pounds, that in the last car 64 pounds, and the intermediate cars ranging between these two pressures. With the exhaust valve pistons calculated to balance on an excess auxiliary reservoir pressure of 7 pounds, it follows that the critical pressure for the automatic opening of the exhaust ports 22 will be 71 pounds for the rear car and 75 pounds for the first car, with variant critical pressures between these figures for the intermediate cars depending on their position in the train. Therefore as the recharging proceeds, the exhaust valve piston on the rear car begins to move to open the exhaust valve when the train line pressure passes 71 pounds, the piston on each succeeding car, moving to open the related exhaust port as their critical pressures respectively are reached until the leading car piston begins to operate at a pressure of 75 pounds. Thus the brakes are released, first on the rear cars, and then successively toward the head of the train, a most desirable condition of operation, and one not possible to secure with present equipment. Any lagging of the apparatus furthest removed from the locomotive as the train line pressure increases, merely tends toward a simultaneous release of all the brakes, without changing the general beneficial result.

From what has been said, it will be clear that one or more cars left standing with brakes set may be picked up by a locomotive, and the brakes automatically released as soon as the critical pressure is passed in recharging the auxiliary reservoir without bleeding the brakes. Means are however, provided for bleeding the brake cylinder to release the brakes when it is necessary to move the car without coupling up the train line.

Formed in the housing 2 is a cylindrical chamber 41, connected near one end (right of Fig. 3) with passage 9 by the passage 42.

The end of the chamber 41 is closed by the screw plug 43, thru which passages 44 extend so that the end of the chamber is in communication with the open air. The end of the plug is provided with an annular flange 46 forming a valve seat adapted to be engaged by the annular gasket 47 disposed on the end of the piston valve 48 which forms a rather loose sliding fit in the chamber 41. A stem 49 on the piston valve extends thru the plug 43 and is adapted to be engaged by the lever 51 pivoted on the lug 52 extending from the housing 2. A link 53 pivoted to the lever 51 and extending to the side of the car, provides a handle with which the bleed valve may be opened. A link 54 extending above my device to the opposite side of the car is pivoted to the lever 56 which is pivoted on the lug 57 extending from the housing. The lower end of the lever 56 is adapted to engage the lever 51, operating it to open the bleed valve when the link 54 is pulled.

At the inner end of the chamber a spring pressed check valve 58 is arranged to control the flow of air thru the passage 59, connecting the chamber 41 with the conduit 61, which opens into the branch line 62. Air may thus pass from the train line 69 thru conduit 61, passage 59 and past the valve into the chamber 41, but cannot flow from the chamber into the passage 59. The special function of the check valve is to prevent the undesired movement of the piston valve 48 with a reduction in train line pressure.

Normally the bleed valve parts are as shown in Fig. 3, the piston valve 48 covering the passage 42 and tightly seated on the flange 46 to prevent leakage thru passages 44. The valve 48 is normally held in this position by the pressure in the chamber 41, which is obviously that of the train line. Leakage past the valve 48 escapes into passage 42 in which the pressure is that of the auxiliary reservoir.

When it is desired to bleed the brakes, one of the links 53 or 54 is pulled out, thus pushing in the piston valve and uncovering the passage 42, so that the air from the brake cylinder may exhaust into the end of the chamber 41 and escape thru passages 44 into the open air. Air from the auxiliary reservoir also passes the valve 36 and escapes thru the same passage. Since there is no pressure in the train line the valve 48 remains in the open position when pushed there by the pull on one of the links, and a brakeman can therefore pass rapidly along a string of cars, opening the bleed valve as he goes. With the opening of the bleed valve the air is soon exhausted from the brake cylinder and auxiliary reservoir and the brakes released. No further attention need be given the bleed valve, the single pull on the link being sufficient.

When the car is again coupled into a train, and air is pumped into the train line to recharge the auxiliaries, the valve 58 opens and the piston valve 48 is forced upon its seat, sealing the escape passages 44 and covering the passage 42.

I claim:

1. A control valve for air brake systems comprising a housing adapted to be interposed between the auxiliary reservoir and the triple valve, a valve in said housing for controlling the exhaustion of air from the brake cylinder, and means responsive when the auxiliary reservoir pressure exceeds the brake cylinder pressure by a predetermined amount for opening said valve.

2. A control valve for air brake systems comprising a housing adapted to be interposed between the auxiliary reservoir and the triple valve, a valve in said housing for controlling the exhaustion of air from the brake cylinder and a spring-held piston movable against the spring when the auxiliary reservoir pressure exceeds the brake cylinder pressure by a predetermined amount for opening said valve.

3. A control valve for air brake systems comprising a housing adapted to be interposed between the auxiliary reservoir and the triple valve, a valve in said housing for controlling the brake cylinder exhaust passage, and means operative when the auxiliary reservoir pressure is less than the brake cylinder pressure plus a predetermined excess for closing said valve.

4. A control valve for air brake systems comprising a housing adapted to be interposed between the auxiliary reservoir and the triple valve, a valve in said housing for controlling the brake cylinder exhaust passage, and means operative when the auxiliary reservoir pressure is less than the brake cylinder pressure plus a predetermined excess for closing said valve and operative when the auxiliary reservoir pressure exceeds the brake cylinder pressure by at least said excess for opening said valve.

5. A control valve for air brake systems comprising a housing adapted to be interposed between the auxiliary reservoir and the triple valve, a valve in said housing for controlling the brake cylinder exhaust passage, a piston operatively connected to said valve and exposed on one side to brake cylinder pressure and on the opposite side to auxiliary reservoir pressure, and a spring interposed between said valve and said housing.

6. A control valve for air brake apparatus comprising a housing adapted to be interposed between the auxiliary reservoir and the triple valve, a valve in said housing for controlling the brake cylinder exhaust passage, a piston operatively connected to said valve and exposed on one side to brake cylinder pressure and on the opposite side to auxiliary reservoir pressure, and a spring compressed when said valve is open for closing the valve when the difference in air pressures on opposite sides of said piston is less than the expansive power of said spring.

7. A control valve for air brake systems comprising a housing adapted to be interposed between the auxiliary reservoir and the triple valve, a valve in said housing for controlling the brake cylinder exhaust passage, a piston operatively connected to said valve and exposed on one side to brake cylinder pressure and on the opposite side to auxiliary reservoir pressure, and a spring compressed by movement of said piston to open said valve when the difference in air pressures on opposite sides of said piston equals or exceeds a predetermined amount and expansible to close said valve when said pressure differential is less than said predetermined amount.

8. A control valve for air brake systems comprising a housing formed with a passage for connecting the triple valve to the brake cylinder, a check valve in said passage, said housing being formed with a by-pass about said check valve, a valve for controlling the flow of air thru said by-pass, and means operative when the auxiliary reservoir pressure is less than the brake cylinder pressure plus a predetermined excess for closing said valve.

9. A control valve for air brake systems comprising a housing formed with a passage for connecting the triple valve to the brake cylinder, a check valve in said passage, said housing being formed with a by-pass about said check valve, a valve for controlling the flow of air thru said by-pass, a piston operatively connected to said valve and exposed on one side to brake cylinder pressure and on the opposite side to auxiliary reservoir pressure, and a spring interposed between said valve and said housing.

10. A control valve for air brake systems comprising a housing formed with a passage for connecting the triple valve to the brake cylinder, a check valve in said passage, said housing being formed with a by-pass about said check valve, a valve for controlling the flow of air thru said by-pass, a piston operatively connected to said valve and exposed on one side to brake cylinder pressure and on the opposite side to auxiliary reservoir pressure, and a spring compressed when said valve is open for closing the valve when the difference in air pressures on opposite sides of said piston is less than the expansive power of said spring.

11. A control valve for air brake systems comprising a housing formed with a passage for connecting the triple valve to the brake cylinder, a check valve in said passage, said housing being formed with a by-pass about said check valve, and with a piston chamber in communicating with the auxiliary reservoir at one end and with the brake cylinder at the other end, a piston arranged in said chamber, a valve for controlling the flow of air thru said by-pass operatively connected to said piston, and a spring tending to effect the closing of said valve.

12. A control valve for air brake systems comprising a housing formed with a passage for connecting the triple valve to the brake cylinder, a check valve in said passage, said housing being formed with a by-pass about said check valve and with a piston chamber in communication with the auxiliary reservoir at one end and with the brake cylinder at the other end, a piston arranged in said chamber, a piston rod extending from said piston, a slide valve for controlling the flow of air thru said by-pass connected to said piston rod for longitudinal movement therewith, means for resiliently pressing said slide valve to its seat, and a spring tending to effect the closing of said valve interposed between said valve and said housing.

13. A control valve for air brake systems comprising a housing adapted to be interposed between the auxiliary reservoir and the triple valve and formed with a passage for connecting the triple valve with the brake cylinder pipe and a passage for connecting the triple valve with the auxiliary reservoir, a check valve in said housing for closing the first named passage against a return flow of air from the brake cylinder to the triple valve, said housing being formed with a by-pass about said check valve, a valve for controlling the flow of air thru said by-pass a piston in said housing operatively connected to said valve and exposed on one side to brake cylinder pressure and on the opposite side to auxiliary reservoir pressure, and a spring tending to close said valve.

In testimony whereof, I have hereunto set my hand.

THOMAS J. STEINKELLER.